(12) United States Patent
Jha et al.

(10) Patent No.: US 10,694,453 B2
(45) Date of Patent: Jun. 23, 2020

(54) DISCOVERY AND NETWORK ACCESS PROCEDURES FOR 5G THINGS COMMUNICATION SYSTEM

(71) Applicant: Intel Corporation and Intel IP Corporation, Santa Clara, CA (US)

(72) Inventors: Satish Chandra Jha, Hillsboro, OR (US); Qian Li, Beaverton, OR (US); Guangjie Li, Beijing (CN); Yaser M. Fouad, Hillsboro, OR (US); Joonbeom Kim, Carrollton, TX (US); Vesh Raj Sharma Banjade, Hillsboro, OR (US); Lu Lu, Hillsboro, OR (US); Dawei Ying, Hillsboro, OR (US); Hassan Ghozlan, Hillsboro, OR (US); Xiaoyun May Wu, Portland, OR (US); Geng Wu, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/079,756

(22) PCT Filed: Oct. 24, 2016

(86) PCT No.: PCT/US2016/058480
§ 371 (c)(1),
(2) Date: Aug. 24, 2018

(87) PCT Pub. No.: WO2017/146777
PCT Pub. Date: Aug. 31, 2017

(65) Prior Publication Data
US 2019/0357123 A1 Nov. 21, 2019

Related U.S. Application Data

(60) Provisional application No. 62/300,332, filed on Feb. 26, 2016, provisional application No. 62/329,047,
(Continued)

(51) Int. Cl.
*H04W 4/00* (2018.01)
*H04W 48/16* (2009.01)
*H04W 8/00* (2009.01)

(52) U.S. Cl.
CPC .......... *H04W 48/16* (2013.01); *H04W 8/005* (2013.01)

(58) Field of Classification Search
CPC combination set(s) only.
See application file for complete search history.

(56) References Cited

U.S. PATENT DOCUMENTS

| 2014/0056220 A1* | 2/2014 | Poitau | H04W 76/14 370/328 |
|---|---|---|---|
| 2014/0206322 A1 | 7/2014 | Dimou et al. | |

(Continued)

FOREIGN PATENT DOCUMENTS

| TW | 201739300 A | 11/2017 |
|---|---|---|
| WO | WO-2016013826 A1 | 1/2016 |

OTHER PUBLICATIONS

"International Application Serial No. PCT/US2016/058480, International Search Report dated Jan. 31, 2017", 8 pgs.
(Continued)

*Primary Examiner* — Justin Y Lee
(74) *Attorney, Agent, or Firm* — Kowert, Hood, Munyon, Rankin & Goetzel, P.C.

(57) ABSTRACT

Systems and methods of providing communications between UEs are generally described. A notification resource indicating subsequent transmission of a discovery message is transmitted from a UE to another UE using a discovery ID selected from a limited number of discovery IDs stored in the other UE. The other UE transmits a random access request to the UE having a temporary ID. The UE may not respond if the temporary ID is already used or may transmit data transmission information scrambled by the
(Continued)

temporary ID. The other UE transmits a contention resolution PDU to the UE and may receive an ACK to indicate ID contention is not present, or either no response or a NACK to indicate the presence of ID contention. The other UE may either select a new temporary ID or use a backoff timer to retransmit the random access request at a random time.

29 Claims, 10 Drawing Sheets

Related U.S. Application Data filed on Apr. 28, 2016, provisional application No. 62/371,637, filed on Aug. 5, 2016.

(56) References Cited

U.S. PATENT DOCUMENTS

| | | |
|---|---|---|
| 2015/0271786 A1 | 9/2015 | Xue et al. |
| 2015/0365942 A1 | 12/2015 | Niu et al. |
| 2018/0035276 A1* | 2/2018 | Kang ................... H04W 76/14 |

OTHER PUBLICATIONS

"International Application Serial No. PCT/US2016/058480, Written Opinion dated Jan. 31, 2017", 6 pgs.

* cited by examiner

| R | RA-FIELD-TYPE=000 | E=0 | OCTET 1 |
|---|---|---|---|
| tUE MAC ID (6 BYTES = 48 BITS) | | | OCTET 2 |
| tUE MAC ID | | | OCTET 3 |
| tUE MAC ID | | | OCTET 4 |
| tUE MAC ID | | | OCTET 5 |
| tUE MAC ID | | | OCTET 6 |
| tUE MAC ID | | | OCTET 7 |
| tUE MAC ID | | | OCTET 8 |

DISCOVERY AND NETWORK ACCESS PROCEDURES FOR 5G THINGS COMMUNICATION SYSTEM

PRIORITY CLAIM

This application is a U.S. National Stage Filing under 35 U.S.C. 371 from International Application No. PCT/US2016/058480, filed Oct. 24, 2016 and published in English as WO 2017/146777 on Aug. 31, 2017, which claims the benefit of priority to U.S. Provisional Patent Application Ser. No. 62/371,637, filed Aug. 5, 2016, and entitled "DISCOVERY AND NETWORK ACCESS PROCEDURES FOR INTERNET OF THINGS COMMUNICATION SYSTEM," U.S. Provisional Patent Application Ser. No. 62/329,047 filed Apr. 28, 2016, entitled "SUBFRAME STRUCTURE FOR COMMUNICATION OF UNDERLAY INFRASTRUCTURE LESS NETWORKS," and U.S. Provisional Patent Application Ser. No. 62/300,332, filed Feb. 26, 2016, each of which is incorporated herein by reference in its entirety.

TECHNICAL FIELD

Embodiments pertain to radio access networks. Some embodiments relate to wearable devices in various cellular and wireless local area network (WLAN) networks, including Third Generation Partnership Project Long Term Evolution (3GPP LTE) networks and LTE advanced (LTE-A) networks as well as $4^{th}$ generation (4G) networks and $5^{th}$ generation (5G) networks. Some embodiments relate to 5G wearable devices and network interactions.

BACKGROUND

The use of 3GPP LTE systems (including both LTE and LTE-A systems) has increased due to both an increase in the types of devices user equipment (UEs) using network resources as well as the amount of data and bandwidth being used by various applications, such as video streaming, operating on these UEs. For example, the growth of network use by Internet of Things (IoT) UEs, which include machine type communication (MTC) devices such as sensors and may use machine-to-machine (M2M) communications, has severely strained network resources. New 3GPP standard releases related to the next generation network (5G) are taking into account the massive influx of low-data, high-delay and low power transmissions.

One type of user-based IoT devices developed recently whose popularity has exploded is wearable devices. Wearable devices, such as fitness trackers, smart watches, smart glasses, etc., typically have a low battery capacity and a low internal memory capacity. In terms of deployment, each user may carry multiple wearable devices, and may be located in a highly-dense populated scenario with other people carrying wearable devices. Unlike many MTC IoT devices, wearable devices may have a mobility similar to that of cell phones and a greater, albeit still limited, functionality. One mobility-related aspect to be developed for such devices is discovery and access.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
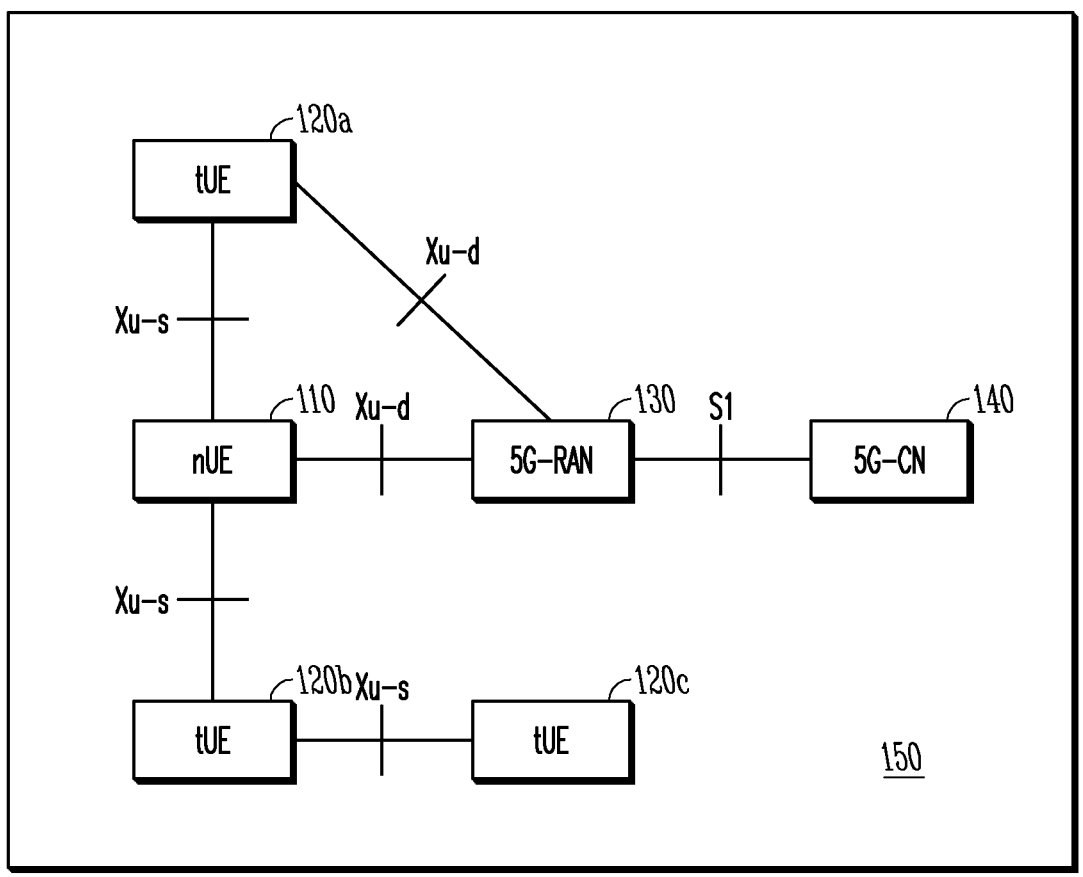
FIG. 1 is a block diagram of a system architecture for supporting wearable devices in accordance with some embodiments.

FIG. 1 is a block diagram of a system architecture 100 for supporting wearable devices. As shown, the system architecture 100 includes a network user equipment (nUE) 110, one or more things user equipment (tUEs) 120a. 120b, 120c, an evolved universal terrestrial radio access network (EU-TRAN) base station (BS, also referred to as an evolved NodeB (eNB)) or 5G base station 130, and an evolved packet core (EPC) or 5G core 140. The nUE 110 and the tUEs 120 together form a personal area network (PAN) 150 or side link cell.

The nUE 110 may be any user equipment capable of communicating with the base station 130 via an air interface. According to some examples, the nUE 110 may be a mobile phone, a tablet computer, a wearable device such as a smart watch, etc. According to some examples, the nUE may be a tUE that is capable of communicating with the base station 130 and has sufficient battery life (e.g., greater than 30%, 50%, 75%, 90% of the maximum amount of battery power etc.). The nUE 110 may have a full infrastructure network access protocol and full control and user plane (C/U-dlane) functions. As shown, the nUE 110 may communicate with the base station 130 via a Xu-d (direct) air interface.

Each tUE 120 may include a wireless interface (Xu-d or Xu-s) for communicating within the PAN 150. The tUE 120 may communicate with the nUE 110 or another tUE 120 through the Xu-s (sidelink) intra-PAN air interface. The tUE 120 may include, for example, smart watches, smart glasses, smart headphones, fitness sensors, movement trackers, sleep sensors, etc. In some embodiments, the tUE 120 may also communicate directly with the base station 130 via a Xu-d air interface. In some embodiments, the tUE 120 may be unable to communicate directly with the base station 130. The nUE 110 may act as a master UE in a sidelink cell formed by the nUE 110 and associated tUEs 120. The tUE 120 may have a full sidelink protocol stack and may or may not have standalone direct link protocol stack. The tUE 120 may act as a slave UE in the side link cell.

The base station 130 may be a base station of a cellular network. The base station 130 is may be an eNB in a LTE cellular network or a 5G Radio Access Network (RAN) in a next generation (5G) network. In the latter case, the 5G RAN may be a standalone base station or a booster cell anchored to an eNB. The base station 130 may communicate with a core network 140 (EPC for LTE or 5G core for 5G) using an S1 interface. Some aspects of the subject technology are directed to defining the air interface between the base station and the PAN of the nUE 110 and the tUEs 120, while other aspects are directed to defining the intra-PAN air interface for enabling low power operation with diverse traffic and application requirements.

Some aspects of the subject technology may be implemented in conjunction with a LTE network, and, in some cases, leverages device-to-device (D2D) and machine-type communications (MTC) technology. However, for connectivity techniques, aspects of the subject technology address high-density scenarios. For LTE-D2D, some aspects of the subject technology enable PAN-specific identity, unicast in intra-PAN communication, uplink and downlink features, and operation in unlicensed bands. For LTE-MTC, some aspects of the subject technology provide support for diverse traffic, including high rate traffic and low latency traffic.

The base station 130 may be a macro base station or a smaller base station (micro, pico, nano) that may terminate the air interface protocol. In some embodiments, the base station 130 may fulfill various logical functions for the RAN including, but not limited to, RNC (radio network controller functions) such as radio bearer management, uplink and downlink dynamic radio resource management and data packet scheduling, and mobility management. In accordance with embodiments, UEs 120 may be configured to communicate orthogonal frequency division multiplexed (OFDM) communication signals with the base station 130 over a multicarrier communication channel in accordance with an OFDMA communication technique. The OFDM signals may comprise a plurality of orthogonal subcarriers. In other embodiments, such as those related to 5G systems, non-OFDM signals may be used in addition or instead of OFDM signals.

The S1 interface may be the interface that separates the RAN 130 and the core network 140. The S1 interface may be split into two parts: the S1-U, which may carry traffic data between base stations of the RAN 130 and other elements of the core network, such as a serving GW, and the S1-MME, which may be a signaling interface between the RAN 130 and an MME.

Figure 2:
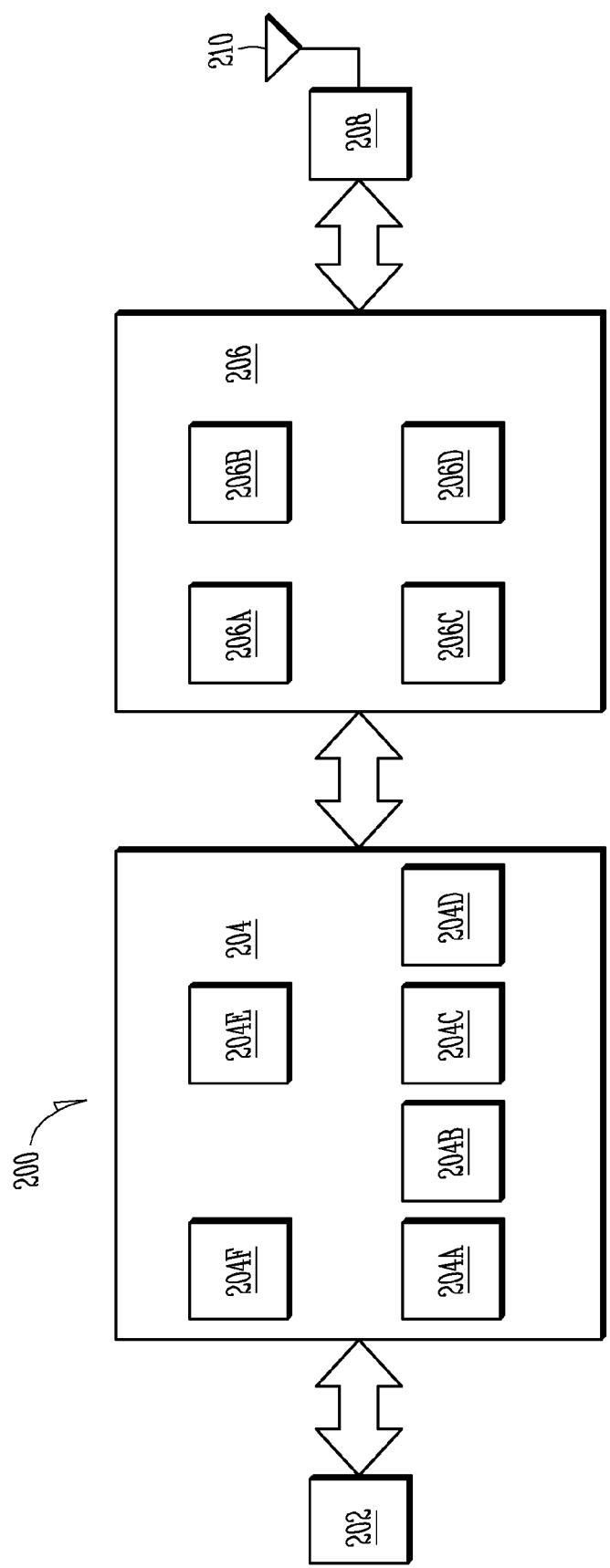
FIG. 2 illustrates components of a communication device in accordance with some embodiments.

FIG. 2 illustrates components of a communication device in accordance with some embodiments. The communication device 200 may be a UE, eNB or other network component as described herein. The communication device 200 may be a stationary, non-mobile device or may be a mobile device. In some embodiments, the UE 200 may include application circuitry 202, baseband circuitry 204, Radio Frequency (RF) circuitry 206, front-end module (FEM) circuitry 208 and one or more antennas 210, coupled together at least as shown. At least some of the baseband circuitry 204, RF circuitry 206, and FEM circuitry 208 may form a transceiver. In some embodiments, other network elements, such as the MME may contain some or all of the components shown in FIG. 2.

The application or processing circuitry 202 may include one or more application processors. For example, the application circuitry 202 may include circuitry such as, but not limited to, one or more single-core or multi-core processors. The processor)s(may include any combination of general-purpose processors and dedicated processors (e.g., graphics processors, application processors, etc. (The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204*a*, third generation (3G) baseband processor 204*b*, fourth generation (4G) baseband processor 204*c*, and/or other baseband processor(s) 204*d* for other existing generations, generations in development or to be developed in the future (e.g., fifth generation (5G), 5G, etc.). The baseband circuitry 204 (e.g., one or more of baseband processors 204*a-d*) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include FFT, precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an Evolved UTRON (EUTRAN) protocol including, for example, physical (PHY), media access control (MAC), radio link control (RLC), packet data convergence protocol (PDCP), radio resource control (RRC) elements, and/or Non-Access Stratum (NAS) elements. A central processing unit (CPU) 204*e* of the baseband circuitry 204 may be configured to run elements of the protocol stack for signaling of the PHY, MAC, RLC, PDCP and/or RRC layers, and/or NAS. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuit 204 and the application circuitry 202 may be implemented together such as, for example, on a system on a chip)SOC(.

In some embodiments, the baseband circuitry 204 may provide for communication compatible with one or more radio technologies. For example, in some embodiments, the baseband circuitry 204 may support communication with an EUTRAN and/or other wireless metropolitan area networks) WMAN (a wireless local area network) WLAN (a wireless personal area network) WPAN. (Embodiments in which the baseband circuitry 204 is configured to support radio communications of more than one wireless protocol any be referred to as multi-mode baseband circuitry. In some embodiments, the device can be configured to operate in accordance with communication standards or other protocols or standards, including Institute of Electrical and Electronic Engineers (IEEE) 802.16 wireless technology (Wi-Max), IEEE 802.11 wireless technology (WiFi) including IEEE 802.11 ad, which operates in the 60 GHz millimeter wave spectrum, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the communication device 200 may include additional elements such as, for example, memory/storage, display, camera, sensor, and/or input/output)I/O(interface as described in more detail below. In some embodiments, the communication device 200 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the communication device 200 may include one or more user interfaces designed to enable user interaction with the system and/or peripheral component interfaces designed to enable peripheral component interaction with the system. For example, the communication device 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 210 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210 may be effectively separated to take advantage of spatial diversity and the different channel characteristics that may result.

Although the communication device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 3:
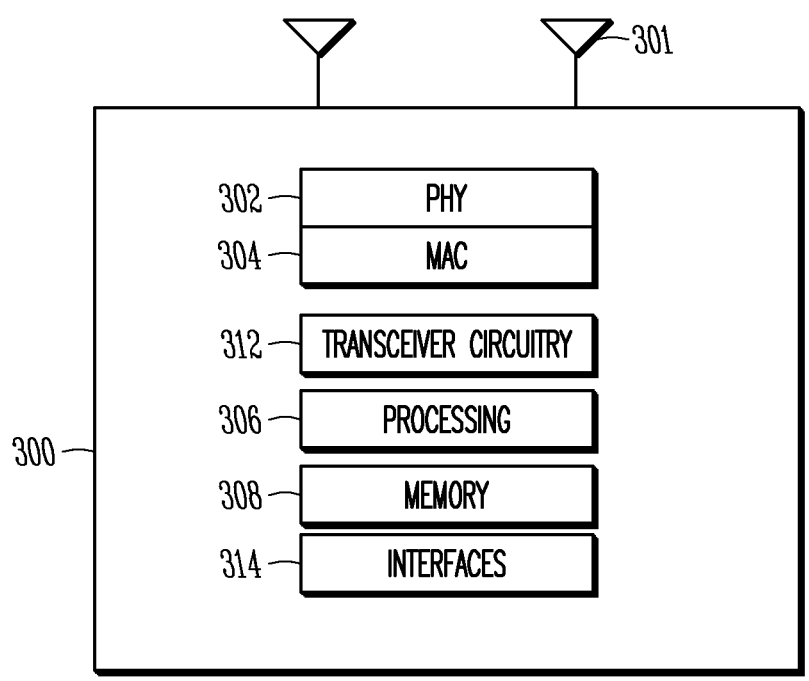
FIG. 3 illustrates a block diagram of a communication device in accordance with some embodiments.

FIG. 3 is a block diagram of a communication device in accordance with some embodiments. The device may be a UE, for example, such as the UE shown in FIG. 1. The physical layer circuitry 302 may perform various encoding and decoding functions that may include formation of baseband signals for transmission and decoding of received signals. The communication device 300 may also include medium access control layer (MAC) circuitry 304 for controlling access to the wireless medium. The communication device 300) may also include processing circuitry 306, such as one or more single-core or multi-core processors, and memory 308 arranged to perform the operations described herein. The physical layer circuitry 302, MAC circuitry 304 and processing circuitry 306 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 300 can be configured to operate in accordance with 3GPP standards or other protocols or standards, including WiMax, WiFi, WiGig, GSM, EDGE, GERAN. UMTS, UTRAN, or other 3G, 3G, 4G, 5G, etc. technologies either already developed or to be developed. The communication device 300 may include transceiver circuitry 312 to enable communication with other external devices wirelessly and interfaces 314 to enable wired communication with other external devices. As another example, the transceiver circuitry 312 may perform various transmission and reception functions such as conversion of signals between a baseband range and a Radio Frequency (RF) range.

The antennas 301 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 301 may be effectively separated to take advantage of spatial diversity and the different channel characteristics that may result.

Although the communication device 300 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

Figure 4:
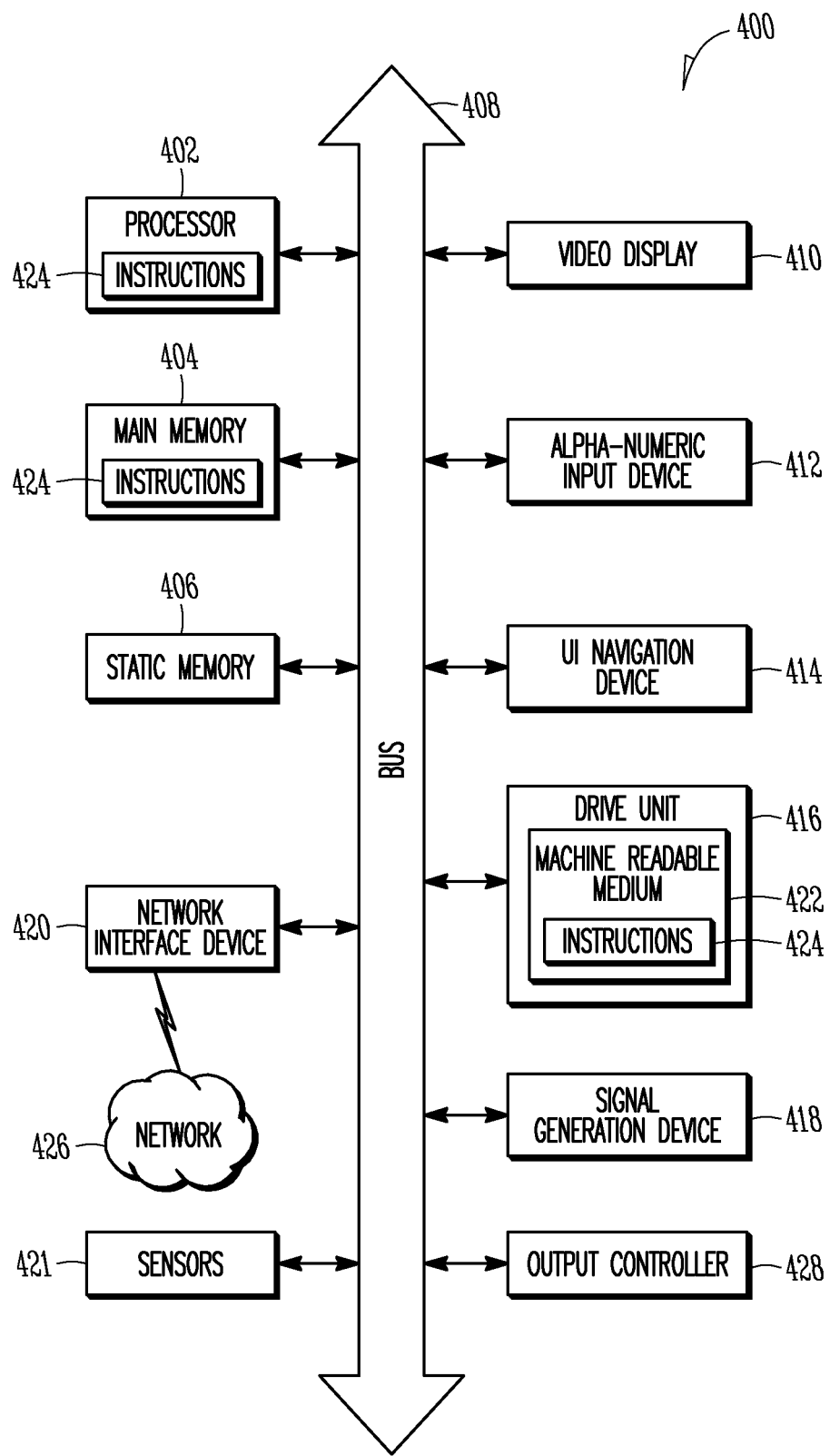
FIG. 4 illustrates another block diagram of a communication device in accordance with some embodiments.

FIG. 4 illustrates another block diagram of a communication device in accordance with some embodiments. In alternative embodiments, the communication device 400 may operate as a standalone device or may be connected (e.g., networked) to other communication devices. In a networked deployment, the communication device 400 may operate in the capacity of a server communication device, a client communication device, or both in server-client network environments. In an example, the communication device 400 may act as a peer communication device in peer-to-peer (P2P) (or other distributed) network environment. The communication device 400 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The communication device 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The communication device 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a communication device readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the communication device 400. In an example, one or any combination of the hardware processor 402, the main memory 404, the static memory 406, or the storage device 416 may constitute communication device readable media.

While the communication device readable medium 422 is illustrated as a single medium, the term "communication device readable medium" may include a single medium or multiple media (e.g., a centralized or distributed database, and/or associated caches and servers) configured to store the one or more instructions 424.

The term "communication device readable medium" may include any medium that is capable of storing, encoding, or carrying instructions for execution by the communication device 400 and that cause the communication device 400 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 family of standards known as WiFi®, IEEE 802.16 family of standards known as WiMax®), IEEE 802.15.4 family of standards, a LTE family of standards, a UMTS family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), MIMO, or multiple-input single-output (MISO) techniques. In some examples, the network interface device 420 may wirelessly communicate using Multiple User MIMO techniques. The term "transmission medium" shall be taken to include any intangible medium that is capable of storing, encoding or carrying instructions for execution by the communication device 400, and includes digital or analog communications signals or other intangible medium to facilitate communication of such software.

As above, in certain embodiments, a tUE such as a wearable device may be temporarily or permanently constrained to communicate with the RAN through a nUE. Several tUEs may be associated with a particular nUE to form a PAN. A large number of nUEs may be located in a particular geographical region served by a single RAN. Each nUE may be associated with a different PAN, which may create a high density network scenario. The RAN may furthermore assign a common resource pool for wearable communication. This resource pool may be shared among all of the PANs in the geographical area and within each PAN on a contention-based resource access basis.

However, prior to communicating over the Xu-s interface, the tUE may perform a discovery procedure to discover a nUE, and subsequently associate itself with the nUE. A discovery mechanism may be developed that enables the tUE and the nUE to discover each other and obtain initial basic information about each other before being able to establish data communications. Once the tUE discovers the nUE, an initial network access process over Xu-s interface may be employed for the tUE to obtain a tUE ID and to register in the network. The tUE ID may be relatively short compared with the nUE ID and may be unique within the PAN. Initial network access may be a part of discovery mechanism in some cases. The discovery mechanism may include several individual mechanisms, including a mechanism for the nUE to acquire resources for transmission of the discovery message and for transmission of the discovery message, a mechanism at the tUE to monitor for the discovery message from the nUE, a random access process over the Xu-s interface for wearable communication and a data packet unit to be transmitted during the random access process in which the data packet unit carries information for contention resolution and/or discovery response.

The frame structure and resource acquisition for Time Division Duplexing (TDD) data communication over the Xu-s interface may be established such that each frame is 10 ms and is divided into 10 ms subframes. Each subframe may be further divided into several symbols in which the number of symbols per subframe may depend on the subcarrier spacing. For example, there can be 13 symbols in a subframe for a subcarrier spacing of 15 KHz. Each subframe may include symbols to provide contention-based channel access, data transmission and ACK/NACK. In other embodiments, a subcarrier spacing of 60 KHz or 75 KHz may be used. Guard periods may be disposed between the symbols of each area of the subframe.

Random access processes may use contention-based mechanisms that employ a Transmitter resource Acquisition and Sounding (TAS) message and a Receiver resource Acknowledgement and Sounding (RAS) message. The TAS message may be similar to a Request to Send (RTS) message and the RAS message may be similar to a Clear to Send (CTS) message. In some embodiments, resource scheduling for data transmission may include the nUE indicating whether the current subframe is an uplink (UL) subframe or a downlink (DL) subframe in the first symbol of the subframe. If the subframe is indicated as a UL subframe, the tUE may send the TAS message on a Physical Resource Allocation (PRA) unit in next symbol of the subframe to get access to the PRA. One PRA may be equivalent of 1 physical resource block (PRB), 2PRB or 3 PRBs, for example. After receiving the RAS message from the nUE, the tUE may transmit data in the next several symbols of the subframe on the PRA. For example, the tUE may transmit 10 symbols for a subcarrier spacing of 15 KHz. The nUE may in response send an ACK/NACK for reception of the data to the tUE in the last symbol of the subframe. In various embodiments, a contention-free PRA allocation may or may not be present among the tUEs of the same the nUE for UL transmission. Contention on a PRA from the tUEs of nearby nUEs may be increasingly likely with increasing PAN density.

If the subframe is indicated in the first symbol as a DL subframe, the nUE may send a TAS message on a PRA. The TAS message may be addressed to a specific tUE, e.g. by scrambling the first symbol using the tUE ID, and may be transmitted in next symbol of the subframe (after the initial symbol) to access the PRA. After receiving a RAS message from the tUE to which the TAS was addressed, the nUE may transmit data in one or more subsequent symbols of this subframe on the PRA. For example, the nUE may transmit data on 10 symbols for a subcarrier spacing of 15 KHz. The tUE may then transmit an ACK/NACK for reception of the data in the last symbol of the subframe. As above, contention on a PRA from the tUEs of nearby nUEs or transmission of neighboring nUEs may be increasingly likely with increasing PAN density. To combat this, discovery and random access processes are discussed below.

Figure 5:
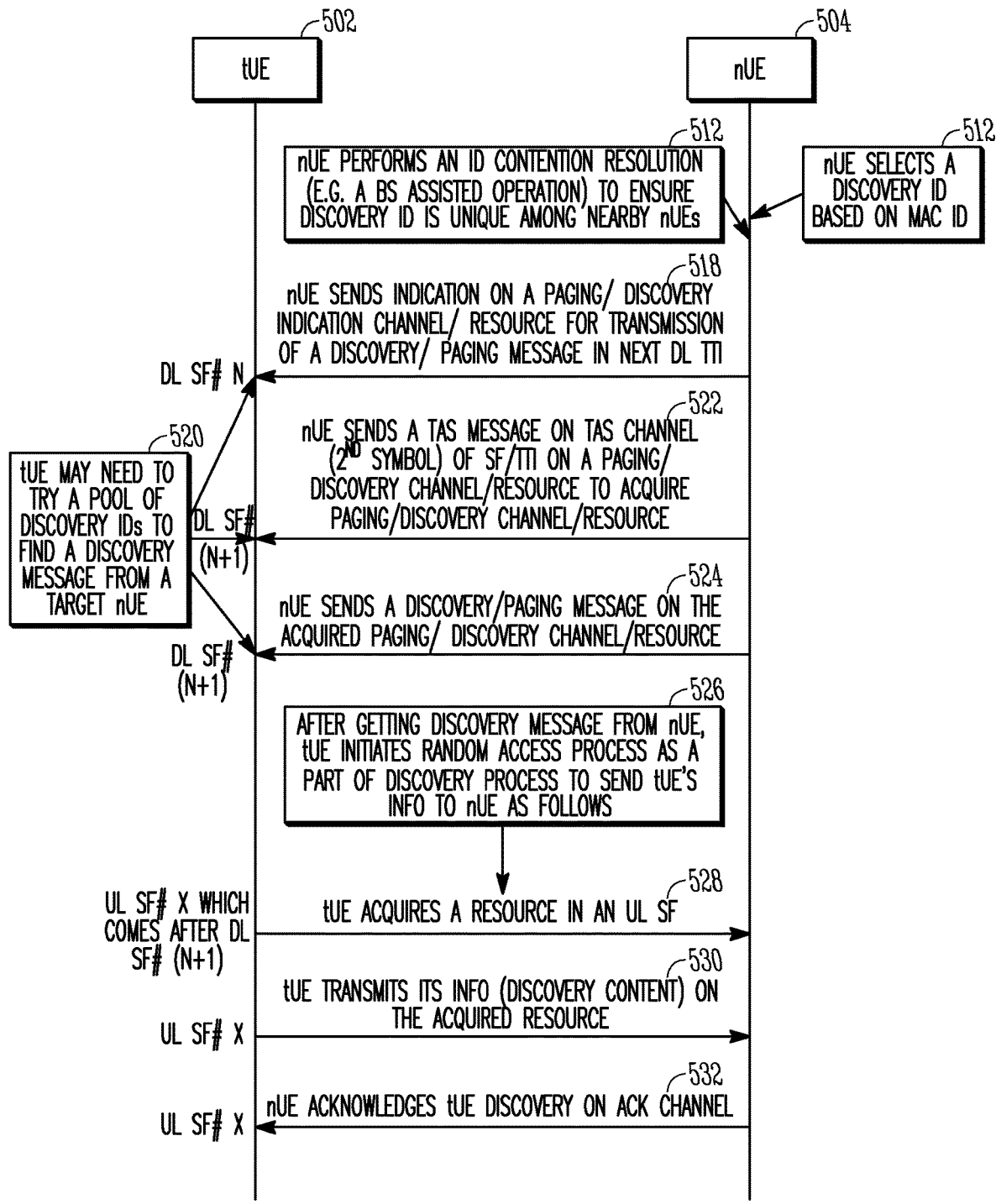
FIG. 5 illustrates a discovery mechanism in accordance with some embodiments.

FIG. 5 illustrates a discovery mechanism in accordance with some embodiments. The mechanism shown in FIG. 5 may be performed by the UEs shown in FIGS. 1-4. FIG. 5 is intended to show major operations in discovery, that is, other operations may also be used, but are not shown for brevity. To initiate the random access process with the nUE over Xu-s interface, at least a minimum amount of information may be used by the tUE. The information may include the nUE MAC ID, security keys, and/or the nUE temporary/short ID. In some cases, however, such as when coming out of a deep power saving state (e.g., an enhanced discontinuous reception eDRX mode), the tUE may not have and may need to obtain the information sufficient to initiate the random access process. Similarly, the nUE with which to be associated may be discovered prior to the tUE initiating communication with the nUE. The discovery operations are provided below.

At operation 512, the nUE 504 may select a discovery ID before initiating transmission of a discovery message to be received by the tUE 502. The discovery message may be periodic, with a periodicity defined by specification or dependent on the nUE 504. The discovery ID may be based on the MAC ID of the nUE 504, and may be, for example, the short temp ID of the nUE 504. The discovery ID may be selected by the nUE 504 from a pool of available discovery IDs. The pool of discovery IDs may be known to the tUE 502 so that the tUE 502 can attempt to decode the initial symbol using the discovery IDs in the pool to receive the discovery message from the nUE 504. Alternately, the tUE 502 may be pre-configured with allowed discovery IDs to receive a discovery message from the nUE 504.

At operation 514, the nUE 504 may perform an eNB-assisted contention resolution operation to ensure that the discovery ID selected is not being used by any other nearby nUEs. If a discovery ID collision occurs, the nUE 504 may select another ID based on the MAC ID and another variable, such as a previous discovery ID used by the nUE 504. The previous discovery ID may be the immediately previous discovery ID or the nth previous discovery ID (n>1). In some embodiments, the previous discovery ID may be used. In other embodiments, the previous discovery ID may be modified dependent on the MAC ID (e.g., hashed) to obtain a new discovery ID. The ID selection and contention resolution may be repeated in some embodiments until a unique discovery ID is obtained by the nUE 504. For example, an incremental increase in the previous discovery ID may be used—i.e., the nth previous discovery ID may be used where in each successive attempt n is incremented.

A DL resource that is predefined in frequency and time may be established as a discovery/paging resource. Both the discovery and paging mechanisms may share the same resource in a time division multiplex manner. The resource used can be based on the discovery ID and determined by the nUE 504 and the tUE 502 accordingly at operation 516. Thus, different discovery IDs may be associated with different discovery/paging resources.

At operation 518, a pre-defined DL resource may be established as a discovery/paging notification resource. The discovery/paging notification resource may be determined by the nUE 504 and the tUE 502 based on discovery ID and may be a 1 or 2 bit(s) indication. The discovery/paging notification resource may be transmitted in a first subframe (subframe n). The discovery/paging notification may be transmitted on the discovery/paging notification resource may indicate that a discovery message, a paging message or neither will be transmitted from the nUE 504 on the discovery/paging resource in next DL Transmission Time Interval (TTI), indicated as subframe n+1.

The discovery/paging notification resource may be pre-defined as a relatively small resource, such as 1-2 resource elements (REs) of one of the central 6 PRBs in the first DL subframe of each frame (which may depend on the TDD configuration). In various embodiments, this may be adjusted as desired, e.g., altering the PRB location and/or the DL subframe. The discovery/paging notification resource may occur periodically, such as every frame or every even (or odd) frame. Whether or not a discovery/paging notification resource is present may depend on the presence of the tUE 502; if the tUE 502 is not present, the nUE 504 may refrain from using network resources for the discovery/paging notification resource. The DiscoveryPaging notification sent by the nUE 504 on the discovery notification resource may be addressed to the discovery ID. The absence of a discovery/paging notification may imply that corresponding paging/discovery resource in next DL subframe can be used for regular DL data transmission. As above, a predetermined discovery ID or a set of different discovery IDs may be tried at operation 520 by the tUE 502 to receive the discovery message from the nUE 504.

The nUE 504 may acquire the discovery/paging resource in next subframe (n+1) at operation 522 by transmitting a TAS message on a TAS channel addressed to the discovery ID. The TAS channel may be defined as a predetermined symbol, e.g. symbol 2 for a subcarrier spacing of 15 KHz, of subframe n+1 on the discovery/paging resource.

The nUE 504 may at operation 524 subsequently transmit a discovery message on the data channel on the discovery/paging resource in subframe n+1. The discovery message may include the MAC ID, the nUE 504 short temp ID and/or a security (public) key. The data channel may be defined as one or more symbols, e.g. symbol 4 to next to last symbol, of the DL subframe n+1 on the discovery/paging resource.

The tUE 502, after receiving the discovery message from the nUE 504 at operation 524, may trigger an initial access procedure at operation 526 et seq. The tUE 502 may initiate a random access process as a part of the discovery process to send information of the tUE 502 to the nUE 504.

In particular, in a subsequent subframe after reception of the discovery message, the tUE 502 may acquire an UL resource at operation 528. The tUE 502 may transmit an TAS message on the TAS channel in UL subframe X (where X>n+1). The TAS channel may be defined as a predetermined symbol of the subframe X on the resource to be acquired. The TAS channel of the subsequent subframe may use the same frequencies as the TAS channel of the sub-channel used for discovery/paging or may use different frequencies.

After obtaining the resource at operation 528, at operation 530 the tUE 502 may transmit information on the acquired UL resource (data channel). The information may include the discovery content, which may contain one or more of the tUE 502 MAC ID, the tUE 502 short temp ID and/or the security response, the last of which may be a public key. The data channel may be defined as one or more symbol, e.g. symbol 4 to the next to last symbol, of the UL subframe X on the acquired resource.

After having transmitted the information at operation 530, at operation 532 the nUE 504 may acknowledge the tUE 502 discovery on an ACK Channel. The ACK channel may be defined as a predetermined symbol of the UL subframe X on the acquired resource. The predetermined symbol may be after the data channel, for example, the last symbol of subframe X.

The tUE may thus transmit the discovery information in the above initial access content process. After the discovery information is transmitted between the nUE and the tUE, the discovery information may be then used by the nUE and the tUE to authenticate each other. Once mutually authenticated, the tUE may be associated with the nUE in the PAN and the nUE and the tUE may be connected with each other.

Figure 6:
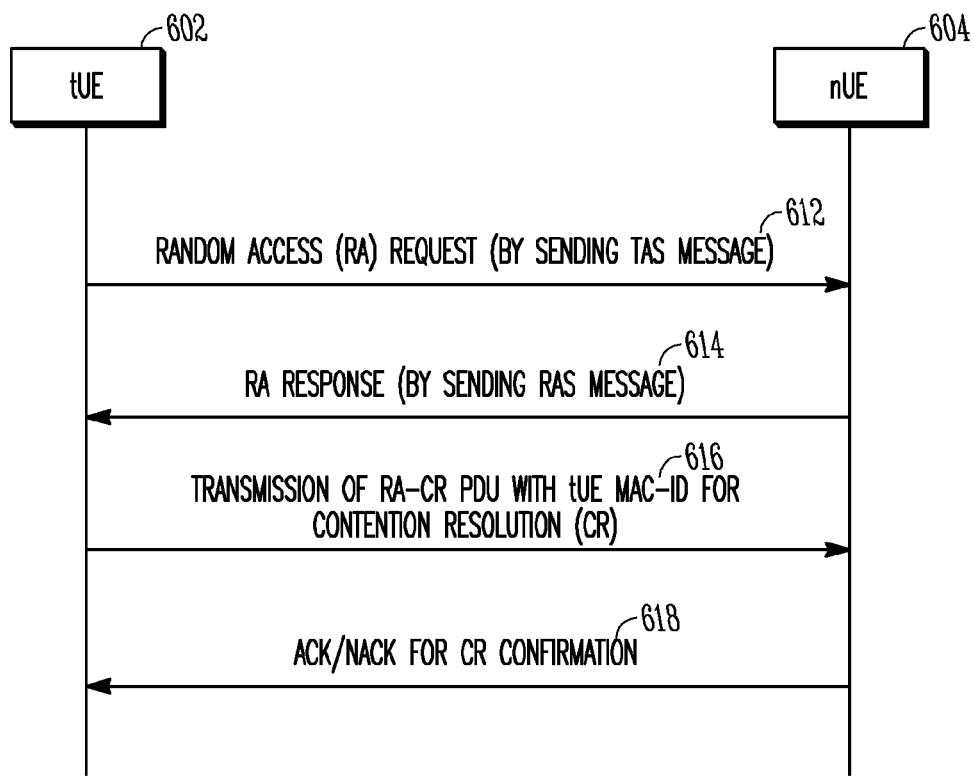
FIG. 6 illustrates a random access procedure in accordance with some embodiments.

As above, after the process shown in the upper portion of FIG. 5, the tUE may initiate a random access procedure. FIG. 6 illustrates a Random Access Procedure in accordance with some embodiments. The mechanism shown in FIG. 6 may be performed by the UEs shown in FIGS. 1-5. FIG. 6 is intended to show major operations in random access procedure, that is, other operations may also be used, but are not shown for brevity. The random access procedure shown in FIG. 6 may be mainly used for initial network access over the Xu-s interface.

As described above, there are a number of events when the discovery procedure, of which random access is part, may be initiated. One such event may be when the tUE 602 is turned on. The random access procedure may also be initiated to request for UL resources. For example, the tUE 602 may make a scheduling request to the nUE 602 for UL resources using the random access procedure when a UL packet arrives at the tUE 602 and the tUE 602 has not received another resource to indicate that the UL packet was scheduled, e.g., when UL resource acquisition is non-contention based (scheduled by the nUE 602). The initial access procedure may also be used when the tUE 602 moves from the idle state to the active state (RRC connected). In this case, the random access procedure may be used to re-confirm the uniqueness of the tUE short ID. The initial access procedure may be used when the tUE 602 comes out of a deep power saving (e.g., eDRX) state and initiates the discovery procedure to determine whether the nUE 604 remains in range. The initial access procedure may also be used when the tUE 602 moves out of, and then re-enters, network coverage. Discovery for re-association may be used in which the random access process is a component procedure. Initial access may also be used when the tUE 602 associates with another nUE, in addition to the nUE 604.

After acquiring sufficient information about the nUE 602 (e.g., by listening to the discovery message), the tUE 602 may monitor each subframe on one or more PRAs where a DL/UL subframe indication control channel is configured. In each of these subframes, the DLUL subframe indication may be configured in a predetermined symbol, such as in the first symbol. In the first symbol of each of these subframes, the nUE 602 may indicate whether the subframe is a UL or DL subframe. Once the tUE 602 determines from the UL/DL indication that the subframe is a UL subframe, the tUE 602 may decide to select a PRA as a random access resource. The tUE 602 may then perform a random access procedure on the same PRA in that subframe. The PRA may be randomly selected from one of the PRAs or may be based on the tUE 602 MAC ID.

The UL/DL indication sent by the nUE 602 in first symbol can be decoded by the tUE 602 as this indication may be scrambled by an nUE ID known to the tUE 602 when the tUE 602 is ready to initiate the random access process. As above, the scrambling ID may be the nUE Temp ID, for example. Each instance of random access process may be 1 subframe long.

After the tUE 602 determines that a particular subframe is a UL subframe and selects the PRA as the random access resource, the tUE 602 may initiate transmission of a random access request at operation 602. In some embodiments, the tUE 602 may select a temporary tUE ID based on a predefined algorithm and parameters. For example, the temporary tUE ID may be derived from the tUE MAC ID. In some embodiments, a mapping function can be defined to generate the temporary tUE ID from the tUE MAC ID in order to reduce probability of the same temporary tUE ID being generated by more than one tUE in the same PAN. At operation 612, the tUE 602 may thus transmit a random access request (TAS message). The temporary tUE ID may be embedded in the TAS message, e.g., by the TAS message being scrambled using the temporary tUE ID.

After receiving the TAS message from the tUE 602, the nUE 604 may identify the source of the TAS message. The nUE 604 may also identify whether the TAS message is a regular data transmission request or a random access request. The default may be that the nUE 604 assumes the TAS message is a data transmission request unless the nUE 604 is able to identify that the TAS message is a random access request. The nUE 604 may identify that the TAS message is a random access request. For example, after detecting a new tUE temporary ID, the nUE 604 may identify that the TAS message is a random access request. Alternately, the TAS message may include a bit to indicate whether the TAS message is request for regular transmission or a random access request. The nUE 604 may respond to the TAS message at operation 614 with a RAS message. The RAS message may include information like the modulation and coding scheme (MCS) and a transmit power recommendation for the packet data unit (PDU) transmission from the tUE 602 described below.

The RAS message may be addressed to the tUE temporary ID transmitted in the TAS message, e.g., by scrambling the message using the tUE temporary ID. If multiple tUEs have selected same temporary tUE ID and simultaneously transmitted a random access request on the same resource, the RAS message may be received by all tUEs.

In case of TAS message collision, i.e. the nUE 604 fails to decode the TAS message from any of the multiple tUEs, the nUE 604 may avoid transmission of a RAS message. The involved tUEs may retry the random access process again later. For example, the tUEs may use a backoff mechanism (such as a random back off mechanism) to try the random access process after some time to reduce probability of further resource collision. The backoff timer may be similar to one of the Inter Frame Space periods of IEEE contention-based mechanisms.

The TAS message may also collide with a regular UL data transmission request from another tUE in the PAN due to the random access message using the same resource or PRA as that used for the UL data transmission. In this case, the nUE 604 may prioritize the UL data transmission request and not transmit the RAS message.

During the random access process, the tUE 602 may select a temporary ID that is already being used by other active tUEs in the PAN. This ID collision can be handled either in operation 614 or in later operations. For example, the TAS message may have a bit informing the nUE 604 that the TAS message is a random access request. In this case, ID collision can be handled in operation 614. The nUE 604, once detecting that the tUE making the random access request has selected a temporary ID that is already in use, may avoid transmission of a RAS message. Alternately, the nUE 604 may transmit a RAS message with a bit indicating that the temporary ID is already in use.

If the TAS message does not have a bit informing the nUE 604 that the TAS message is a random access request, ID collision can be handled during contention resolution. During contention resolution, the nUE 604 can detect that the tUE making random access request has selected a temporary ID that is already in use. Then, at operation 618 the nUE 604 can indicate that the temporary ID is already in use or that contention resolution has failed by sending a NACK.

At operation 616, a contention resolution process may be initiated. In particular, after successful reception of RAS message by the tUE 602 602, contention resolution for the tUE temporary ID may be performed. The tUE 602 may transmit a random access contention resolution (RA-CR) PDU for contention resolution. The RA-CR PDU may contain a MAC ID of the tUE 602 that uniquely identifies the tUE 602, rather than the temporary tUE 602 ID. The RA-CR PDU may also have additional fields related to the tUE 602 and connection. For example, the RA-CR PDU may contain a reason for network access (e.g., random access) and the tUE 602 category and/or capability.

In some embodiments, a field of 3 bit length can be used to specify 8 reasons for random access (or other reasons). Some example reasons for random access can include initial network access (bit field value 000), e.g. as part of discovery process. In another example, bit field value 001 may be used to indicate a UL scheduling request. The UL scheduling request may be a UL grant request due to UL or mobile originated data arrival. The UL scheduling request may be used if the UL resource allocation is handled by the nUE 604. In this case, another field indicating the size of UL data buffer may be included or piggybacked in the RA-CR PDU. The use of a UL scheduling request field may be avoided if UL resource acquisition is performed by the tUE 602 using a contention based approach. In another example, bit field value 010 may be used to reconfirm the tUE temporary short ID. The reconfirmation may be used to ensure that the temporary ID of the tUE 602 is still not allocated to another tUE 602. The reconfirmation may, for example, be used in specific cases such as the tUE 602 has been in the Idle state for an extended period of time and is presently re-entering the active (RRC Connected) state, or while the tUE 602 was in the Idle state, the tUE 602 went out of the nUE 604 coverage for a short amount of time and reentered the nUE 604 coverage. In some embodiments, bit field value 010 may be used to provide a stay alive indication. The stay alive indication may be transmitted periodically to the nUE 604 if the tUE 602 is in the Idle state or other power saving states for an extended period. The periodicity may be set by the standard or may be established by the nUE 604 during association of the tUE 602 with the nUE 604.

At operation 618, the nUE 604 may undertake conflict resolution confirmation. The nUE 604 may determine whether or not an ID conflict exists dependent on whether the nUE 604 detects only one tUE transmitting a MAC ID for conflict resolution. If the nUE 604 determines that no temporary ID contention is present, the nUE 604 may transmit an ACK indicating that conflict resolution is successful. Otherwise, the nUE 604 may transmit a NACK message. The ACK/NACK message can be scrambled with the tUE temporary ID transmitted in the TAS message. Transmission of a NACK may represent random access process failure.

If random access process failure occurs during any of the operations shown in FIG. 6, the associated tUE 602 may attempt retransmission of the random access request in one or more subsequent subframes. As above, tUEs experiencing random access process failure may initiate a backoff mechanism to determine when to perform the next retransmission of the random access request. In each retransmission of random access request, the tUE 602 may generate a new temporary ID, from the MAC ID and/or from the temporary ID of a previous random access request. The tUE 602 may perform a random access request retransmission unless the random access process is successful or a random access request maximum retransmission limit is reached. This limit may be set by specification or by higher layer control signaling during association of the tUE 602 with the nUE 604.

FIGS. 7-14 illustrate a RA-CR PDU in accordance with various embodiments. In particular, FIGS. 7-10 show RA-CR PDUs when the nUE determines in operation 614 that a random access request has been sent and therefore the nUE expects a RA-CR PDU at operation 616. As above, a bit in the TAS message may indicate to the nUE that the TAS message is a random access request. In this case, the use of a flag in the RA-CR PDU indicating the nature of the message to the nUE (i.e., that the transmission is RA-CR PDU) may be avoided. Table 1 provides a description of packet header fields for RA-CR PDUs in FIGS. 7-10.

TABLE 1

Packet header fields for RA-CR PDUs

| Header field | Header field Value | Header field Description |
|---|---|---|
| R (4 bit) | 0 | Reserved for future use |
| E (1 bit) | 0/1 | Extension bit.<br>0 = No more data field after this data field.<br>1 = There is at least one more data field after the data field related to this subheader |
| RA-Field-Type (3 bits) | 000 | The tUE MAC ID field of fixed length (6 Bytes). It contains MAC-ID of 48 bits of the the tUE. |
| | 001 | Access-Reason Field of 4 bits (OPTIONAL FIELD). 16 Access reasons for performing RA can be indicated.<br>For example, 0000 = initial access when the tUE is turned on, 0001 = Initial access when the tUE moves from Idle state to active state, 0010 = initial access when the tUE comes out of deep power saving state, 0011 = Initial access when the tUE moves out of coverage and then comes back to network coverage. 00100 = RA for scheduling request 00101-11111 reserved for future use. |
| | 010 | the tUE-Cat field of 4 bits (OPTIONAL FIELD). 16 tUE categories with various capabilities can be indicated. |
| | 011 | tUE temporary ID of 20 bits |
| | 100-111 | Reserved for future use |

Figure 7:
FIG. 7 illustrates a random access contention resolution (RA-CR) packet data unit (PDU) in accordance with some embodiments.
Figure 8:
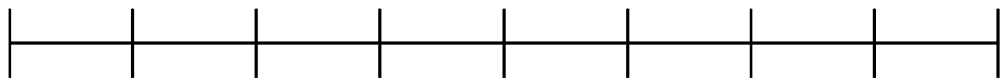
FIG. 8 illustrates another RA-CR PDU in accordance with some embodiments.
Figure 9:
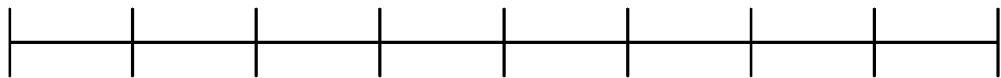
FIG. 9 illustrates another RA-CR PDU in accordance with some embodiments.
Figure 10:
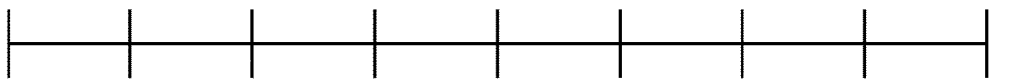
FIG. 10 illustrates another RA-CR PDU in accordance with some embodiments.

FIG. 7 shows a RA-CR PDU containing a tUE MAC ID field. The TAS message may have a bit to indicate to the nUE that the tUE is sending a random access request and therefore the nUE knows that the PDU being transmitted is a RA-CR PDU. FIG. 8 shows a RA-CR PDU containing two fields; a tUE MAC ID field and a Network Access Reason field. The TAS message may have a bit to indicate to the nUE that the tUE is sending a random access request and the nUE is able to determine from this bit that the PDU is a RA-CR PDU. FIG. 9 shows a RA-CR PDU containing 2 fields: a tUE MAC ID field and a tUE Category/Capability field. In this case, the TAS message may have a bit to indicate to the nUE that the tUE is sending a random access request and the nUE is able to determine from this bit that the PDU is a RA-CR PDU. FIG. 10 shows a RA-CR PDU containing 3 fields: a tUE MAC ID field, a Network Access Reason field and a tUE Category/Capability field. Similar to the above, the TAS message may have a bit to indicate to the nUE that the tUE is sending a random access request and the nUE is able to determine from this bit that the PDU is a RA-CR PDU.

FIGS. 11-14 show RA-CR PDUs when the nUE is unable to determine in operation 614 that a random access request has been sent and therefore the nUE expects a data PDU at operation 616. In these embodiments, for example, the TAS message does not contain an indication to the nUE whether the TAS message is a random access request or regular UL data Transmission request. In this case, a flag may be provided in the PDU indicating to the nUE that the PDU is RA-CR PDU. A Content-Type PDU header field may be used to indicate that the PDU is a RA-CR PDU. In particular, Content-Type=111 in each PDU in FIGS. 11-14 may indicate that the PDU is a RA-CR PDU. Table 2 provides packet header fields for RA-CR PDUs of FIGS. 11-14.

TABLE 2

Packet header fields for RA-CR PDUs

| Header field | Header field Value | Header field Description |
| --- | --- | --- |
| R (1 bit) | 0 | Reserved for future use |
| PDU Type (1 bit) | 0/1 | 0 = User plane Data PDU for UP PRAs; 1 = PDU for Control PRAs |
| E (1 bit) | 0/1 | Extension bit. 0 = No more data field after this data field. 1 = There is at least one more data field after the data field related to this subheader |
| Content-Type (3 bits) | 000 | w-HL PDU from retransmission buffer - NOT resegmented |
| | 001 | A segment of a resegmented w-HL PDU from retransmission buffer - PDU resegmented - NOT Last Segment |
| | 010 | The LAST segment of a resegmented w-HL PDU from retransmission buffer - PDU resegmented - Last Segment |
| | 011 | w-HL SDU from UL TX buffer - NOT Segmented |
| | 100 | A segment of a segmented w-HL SDU from UL TX buffer - SDU segmented - NOT Last Segment |
| | 101 | The LAST segment of a segmented w-HL SDU from UL TX buffer - SDU segmented - Last Segment |
| | 110 | Padding |
| | 111 | RA-CR PDU. Only fields related to RA procedure and Contention Resolution are present. No SDU/PDU-segment present. |
| RA-Field-Type (2 bits) | 00 | The tUE MAC ID field of fixed length (6 Bytes). Field contains MAC-ID of 48 bits of the tUE. |
| | 01 | Access-Reason Field of 5 bits (OPTIONAL FIELD). 32 Access reasons for performing RA can be indicated. For example, 00000 = initial access when the tUE is turned on, 00001 = Initial access when the tUE moves from Idle state to active state, 00010 = Initial access when the tUE comes out of deep power saving state, 00011 = Initial access when the tUE moves out of coverage and then comes back to network coverage. 00100 = RA for scheduling request |

TABLE 2-continued

Packet header fields for RA-CR PDUs

| Header field | Header field Value | Header field Description |
| --- | --- | --- |
| | | 00101-11111 reserved for future use. |
| | 10 | the tUE-Cat field of 5 bits (OPTIONAL FIELD). 32 the tUE-categories with various capabilities can be indicated. |
| | 11 | tUE's Temporary ID of 20 bits |

Figure 11:
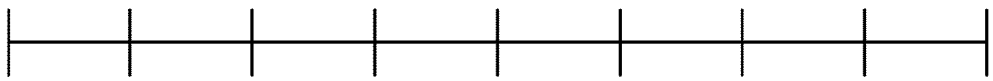
FIG. 11 illustrates another RA-CR PDU in accordance with some embodiments.
Figure 12:
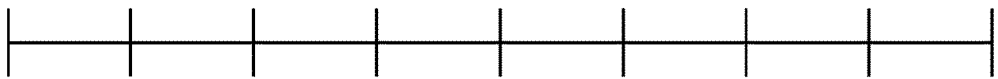
FIG. 12 illustrates another RA-CR PDU in accordance with some embodiments.
Figure 13:
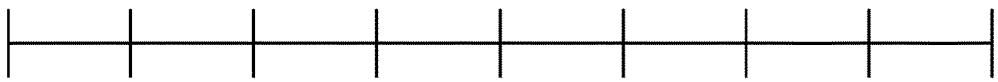
FIG. 13 illustrates another RA-CR PDU in accordance with some embodiments.
Figure 14:
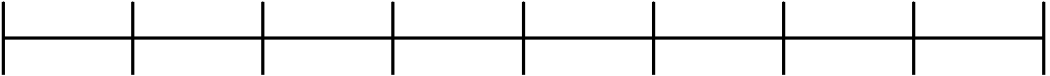
FIG. 14 illustrates another RA-CR PDU in accordance with some embodiments.

In none of FIGS. 11-14 does the TAS message may not have a bit to indicate to the nUE that the tUE is sending a random access request; therefore the nUE is not aware that the PDU being transmitted is a RA-CR PDU. FIG. 11 shows a RA-CR PDU containing a tUE MAC ID field. FIG. 12 shows a RA-CR PDU containing two fields: the tUE MAC ID field and Network Access Reason field. FIG. 13 shows a RA-CR PDU containing 2 fields: the tUE MAC ID field and the tUE Category/Capability field. FIG. 14 shows a RA-CR PDU containing 3 fields: the tUE MAC ID field, Network Access Reason field and the tUE Category/Capability field. In each of FIGS. 11-14, Content-Type=111 may indicate to the nUE that the PDU is RA-CR PDU. In all of the PDU examples, the 3 bit values indicating the particular information may be different from that described.

EXAMPLES

Example 1 is an apparatus of user equipment (UE), the apparatus comprising: memory; and processing circuitry in communication with the memory and arranged to: decode a discovery message from another UE, the discovery message scrambled by a discovery identity (ID) selected from a pool of discovery IDs, the pool of discovery IDs stored in the memory, the discovery message received in a predefined downlink (DL) resource in a first subframe; and encode, for transmission to the other UE, a random access request in a second subframe after receipt of the first subframe, the random access request comprising discovery content comprising one of a temporary ID or a Media Access Control (MAC) ID of the UE and disposed in a plurality of symbols after a first symbol and before a last symbol of the second subframe, the temporary ID generated based on the MAC ID.

In Example 2, the subject matter of Example 1 optionally includes, wherein the processing circuitry is further configured to: determine whether the second subframe is an uplink (UL) or DL subframe dependent on a first symbol of the second subframe, the first symbol scrambled by the discovery ID, wherein the random access request is encoded after a determination that the second subframe is a UL subframe.

In Example 3, the subject matter of Example 2 optionally includes, wherein the processing circuitry is further configured to: select among a plurality of physical resource assignments (PRAs) in the second subframe for transmission of the random access request, the selection dependent on the at least one of the temporary ID or MAC ID of the UE.

In Example 4, the subject matter of any one or more of Examples 2-3 optionally include, wherein the processing circuitry is further configured to: randomly select among a plurality of physical resource assignments (PRAs) in the second subframe for transmission of the random access request.

In Example 5, the subject matter of any one or more of Examples 1-4 optionally include, wherein the processing circuitry is further configured to: decode, at a notification resource scrambled by the discovery ID, an indication of transmission in a next DL transmission time interval of one of a discovery message, a paging message or absence of a discovery and paging message, the discovery ID based on one of a MAC ID or a temporary ID of the other UE.

In Example 6, the subject matter of Example 5 optionally includes, wherein: the notification resource is repeated periodically such that the notification resource occurs in different subframes.

In Example 7, the subject matter of any one or more of Examples 1-6 optionally include, wherein: the discovery message comprises a data channel and an acknowledgment/non-acknowledgment (ACK/NACK), the data channel comprising a plurality of symbols after a first symbol and before a last symbol and comprising at least one of a temporary ID or a MAC ID of the other UE and authentication information, the ACK/NACK disposed in the last symbol of the first subframe, the discovery ID based on the one of the MAC ID or the temporary ID of the other UE.

In Example 8, the subject matter of any one or more of Examples 1-7 optionally include, wherein: the predefined DL resource is dependent on at least one of an ID of the other UE or the at least one of the temporary ID or MAC ID of the UE.

In Example 9, the subject matter of any one or more of Examples 1-8 optionally include, wherein: the discovery ID is based on the MAC ID and a previous discovery ID.

In Example 10, the subject matter of any one or more of Examples 1-9 optionally include, wherein: the random access request comprises a bit to indicate whether the random access request is a request for data transmission or a request for random access.

In Example 11, the subject matter of Example 10 optionally includes, wherein the processing circuitry is further configured to: in response to a failure to receive a response from the other UE in response to the random access request or to reception of a response comprising a bit that indicates that the one of a temporary ID or a MAC ID of the UE is in use, select a new ID for transmission in a new random access request.

In Example 12, the subject matter of any one or more of Examples 1-11 optionally include, wherein the processing circuitry is further configured to: decode a response from the other UE in response to the random access request, the response comprising data transmission information that comprises a modulation and coding scheme and transmit power recommendation, the response scrambled by the one of the temporary ID or the MAC ID of the UE; and encode a data transmission to the other UE based on the data transmission information.

In Example 13, the subject matter of Example 12 optionally includes, wherein: the data transmission comprises one of the MAC ID or the temporary ID of the UE, the processing circuitry is further configured to decode a response to the data transmission, the response comprising one of: an acknowledgement (ACK) scrambled with the temporary ID of the UE to indicate that no contention is present with the temporary ID of the UE, or a non-acknowledgement (NACK) scrambled with the temporary ID of the UE to indicate that contention is present with the temporary ID of the UE.

In Example 14, the subject matter of Example 13 optionally includes, wherein: the data transmission further comprises at least one of a field to indicate a reason for random access or a field that indicates at least one of category or capability of the UE.

In Example 15, the subject matter of any one or more of Examples 13-14 optionally include, wherein the processing circuitry is further configured to: in response to reception of the NACK, generate a new temporary ID and initiate a random backoff mechanism to transmit a new random access request after a random amount of time, the new random access request comprising the new temporary ID.

In Example 16, the subject matter of Example 15 optionally includes, wherein: the new temporary ID is one of: randomly selected or based on the temporary ID.

In Example 17, the subject matter of any one or more of Examples 1-16 optionally include, wherein: the processing circuitry comprises a baseband processor, and the apparatus further comprises a transceiver configured to communicate with the other UE.

Example 18 is an apparatus of user equipment (UE), the apparatus comprising: memory; and processing circuitry in communication with the memory and arranged to: encode for transmission on a notification resource, an indication of transmission in a next downlink (DL) transmission time interval of a discovery message, the indication scrambled by a discovery identity (ID) of the UE, the discovery ID selected from a pool of discovery IDs; encode the discovery message for transmission in a first subframe; and decode, in response to the discovery message, a random access request from another UE in a second subframe, the random access request comprising discovery content of the other UE, the discovery content comprising a temporary ID of the other UE.

In Example 19, the subject matter of Example 18 optionally includes, wherein: a first symbol contains an indication of whether the second subframe is an uplink (UL) or DL subframe, the first symbol scrambled by the discovery ID.

In Example 20, the subject matter of any one or more of Examples 18-19 optionally include, wherein: the discovery message comprises a data channel and an acknowledgment/negative acknowledgment (ACK/NACK), the data channel comprising a plurality of symbols after a first symbol and before a last symbol and comprising a temporary ID of the UE and authentication information, the ACK/NACK disposed in the last symbol of the first subframe.

In Example 21, the subject matter of any one or more of Examples 18-20 optionally include, wherein: the discovery ID is based on a Media Access Control (MAC) ID of the UE and a previous discovery ID.

In Example 22, the subject matter of any one or more of Examples 18-21 optionally include, wherein the processing circuitry is further configured to: determine that the random access request is a random access request based on reception of a new ID in the random access request.

In Example 23, the subject matter of any one or more of Examples 18-22 optionally include, wherein the processing circuitry is further configured to: determine that the random access request is a random access request based on reception of the random access request in a predetermined Physical Resource Allocation (PRA).

In Example 24, the subject matter of any one or more of Examples 18-23 optionally include, wherein: the random access request comprises a bit to indicate which of a request for data transmission or a request for random access the random access request is.

In Example 25, the subject matter of any one or more of Examples 18-24 optionally include, wherein the processing circuitry is further configured to: in response to reception of the random access request, transmit a response containing transmission information for the other UE, the response scrambled by the temporary ID of the other UE, and in response to collision between the random access request and a data transmission from a further UE, avoid transmission of the response.

In Example 26, the subject matter of any one or more of Examples 18-25 optionally include, wherein the processing circuitry is further configured to: in response to an ID collision in which multiple other UEs use the temporary ID of the other UE, one of: avoid transmission of a response to the random access request, transmit a response to the random access request comprising a bit that indicates that the temporary ID is already in use, or in response to reception of a subsequent contention resolution request from the other UE, encode a negative acknowledgment (NACK) for transmission to the other UE.

In Example 27, the subject matter of any one or more of Examples 18-26 optionally include, wherein the processing circuitry is further configured to: in response to reception of the random access request, transmit a response containing transmission information for the other UE, the response scrambled by the temporary ID of the other UE, decode, after transmission of the response, a contention resolution packet data unit (PDU) from the other UE, the contention resolution PDU comprising a Media Access Control (MAC) ID of the other UE and at least one of a field to indicate a reason for random access or a field that indicates at least one of category or capability of the other UE.

In Example 28, the subject matter of Example 27 optionally includes, wherein the processing circuitry is further configured to: encode a response to the contention resolution PDU, the response to the contention resolution PDU comprising one of: an acknowledgement (ACK) scrambled with the temporary ID of the UE to indicate that no contention is present with the temporary ID of the UE, or a negative acknowledgement (NACK) scrambled with the temporary ID of the UE to indicate that contention is present with the temporary ID of the UE.

Example 29 is a computer-readable storage medium that stores instructions for execution by one or more processors of a user equipment (UE), the one or more processors to: receive, at a notification resource scrambled by a discovery identity (ID) of another UE, an indication of transmission in a next downlink (DL) transmission time interval of a discovery message, the discovery ID selected from a pool of discovery IDs; receive the discovery message in a first subframe; transmit, in response to the discovery message, a random access request to the other UE in a second subframe, the random access request comprising discovery content of the UE that comprises a temporary ID of the UE, the discovery content disposed in a plurality of symbols after a first symbol and before a last symbol of the second subframe; receive a response from the other UE in response to the random access request, the response comprising data transmission information and scrambled by the temporary ID of the UE; transmit, based on the data transmission information, a contention resolution packet data unit (PDU) to the other UE; and.

In Example 30, the subject matter of Example 29 optionally includes, wherein: the instructions further configure the one or more processors to a first symbol of the second subframe contains an indication of whether the second subframe is an uplink (UL) or DL subframe, the first symbol scrambled by the discovery ID, and the random access request at least one of: is transmitted in a predetermined Physical Resource Allocation (PRA) reserved for random access requests, or comprises a bit to indicate whether the random access request is a request for data transmission or a request for random access.

Example 31 is an apparatus of user equipment (UE), the apparatus comprising: means for decoding a discovery message from another UE, the discovery message scrambled by a discovery identity (ID) selected from a pool of discovery IDs, the pool of discovery IDs stored in the memory, the discovery message received in a predefined downlink (DL) resource in a first subframe; and means for encoding, for transmission to the other UE, a random access request in a second subframe after receipt of the first subframe, the random access request comprising discovery content comprising one of a temporary ID or a Media Access Control (MAC) ID of the UE and disposed in a plurality of symbols after a first symbol and before a last symbol of the second subframe, the temporary ID generated based on the MAC ID.

In Example 32, the subject matter of Example 31 optionally includes, further comprising: means for determining whether the second subframe is an uplink (UL) or DL subframe dependent on a first symbol of the second subframe, the first symbol scrambled by the discovery ID, wherein the random access request is encoded after a determination that the second subframe is a UL subframe.

In Example 33, the subject matter of Example 32 optionally includes, further comprising: means for selecting among a plurality of physical resource assignments (PRAs) in the second subframe for transmission of the random access request, the selection dependent on the at least one of the temporary ID or MAC ID of the UE.

In Example 34, the subject matter of any one or more of Examples 32-33 optionally include, further comprising: means for randomly selecting among a plurality of physical resource assignments (PRAs) in the second subframe for transmission of the random access request.

In Example 35, the subject matter of any one or more of Examples 31-34 optionally include, further comprising: means for decoding, at a notification resource scrambled by the discovery ID, an indication of transmission in a next DL transmission time interval of one of a discovery message, a paging message or absence of a discovery and paging message, the discovery ID based on one of a MAC ID or a temporary ID of the other UE.

In Example 36, the subject matter of Example 35 optionally includes, wherein: the notification resource is repeated periodically such that the notification resource occurs in different subframes.

In Example 37, the subject matter of any one or more of Examples 31-36 optionally include, wherein: the discovery message comprises a data channel and an acknowledgment/non-acknowledgment (ACK/NACK), the data channel comprising a plurality of symbols after a first symbol and before a last symbol and comprising at least one of a temporary ID or a MAC ID of the other UE and authentication information, the ACK/NACK disposed in the last symbol of the first subframe, the discover, ID based on the one of the MAC ID or the temporary ID of the other UE.

In Example 38, the subject matter of any one or more of Examples 31-37 optionally include, wherein: the predefined DL resource is dependent on at least one of an ID of the other UE or the at least one of the temporary ID or MAC ID of the UE.

In Example 39, the subject matter of any one or more of Examples 31-38 optionally include, wherein: the discovery ID is based on the MAC ID and a previous discovery ID.

In Example 40, the subject matter of any one or more of Examples 31-39 optionally include, wherein: the random access request comprises a bit to indicate whether the random access request is a request for data transmission or a request for random access.

In Example 41, the subject matter of Example 40 optionally includes, further comprising: in response to a failure to receive a response from the other UE in response to the random access request or to reception of a response comprising a bit that indicates that the one of a temporary ID or a MAC ID of the UE is in use, means for selecting a new ID for transmission in a new random access request.

In Example 42, the subject matter of any one or more of Examples 31-41 optionally include, further comprising: decode a response from the other UE in response to the random access request, the response comprising data transmission information that comprises a modulation and coding scheme and transmit power recommendation, the response scrambled by the one of the temporary ID or the MAC ID of the UE; and encode a data transmission to the other UE based on the data transmission information.

In Example 43, the subject matter of Example 42 optionally includes, wherein: the data transmission comprises one of the MAC ID or the temporary ID of the UE, the processing circuitry is further configured to decode a response to the data transmission, the response comprising one of: an acknowledgement (ACK) scrambled with the temporary ID of the UE to indicate that no contention is present with the temporary ID of the UE, or a non-acknowledgement (NACK) scrambled with the temporary ID of the UE to indicate that contention is present with the temporary ID of the UE.

In Example 44, the subject matter of Example 43 optionally includes, wherein: the data transmission further comprises at least one of a field to indicate a reason for random access or a field that indicates at least one of category or capability of the UE.

In Example 45, the subject matter of any one or more of Examples 43-44 optionally include, further comprising: in response to reception of the NACK, means for generating a new temporary ID and initiate a random backoff mechanism to transmit a new random access request after a random amount of time, the new random access request comprising the new temporary ID.

In Example 46, the subject matter of Example 45 optionally includes, wherein: the new temporary ID is one of: randomly selected or based on the temporary ID.

Example 47 is a method of discovery and random access by a user equipment (UE), the method comprising: decoding a discovery message from another UE, the discovery message scrambled by a discovery identity (ID) selected from a pool of discovery IDs, the pool of discovery IDs stored in the memory, the discovery message received in a predefined downlink (DL) resource in a first subframe; and encoding, for transmission to the other UE, a random access request in a second subframe after receipt of the first subframe, the random access request comprising discovery content comprising one of a temporary ID or a Media Access Control (MAC) ID of the UE and disposed in a plurality of symbols after a first symbol and before a last symbol of the second subframe, the temporary ID generated based on the MAC ID.

In Example 48, the subject matter of Example 47 optionally includes, further comprising: determining whether the second subframe is an uplink (UL) or DL subframe dependent on a first symbol of the second subframe, the first symbol scrambled by the discovery ID, wherein the random access request is encoded after a determination that the second subframe is a UL subframe.

In Example 49, the subject matter of Example 48 optionally includes, further comprising: selecting among a plurality of physical resource assignments (PRAs) in the second subframe for transmission of the random access request, the selection dependent on the at least one of the temporary ID or MAC ID of the UE.

In Example 50, the subject matter of any one or more of Examples 48-49 optionally include, further comprising: randomly selecting among a plurality of physical resource assignments (PRAs) in the second subframe for transmission of the random access request.

In Example 51, the subject matter of any one or more of Examples 47-50 optionally include, further comprising: decoding, at a notification resource scrambled by the discovery ID, an indication of transmission in a next DL transmission time interval of one of a discovery message, a paging message or absence of a discovery and paging message, the discovery ID based on one of a MAC ID or a temporary ID of the other UE.

In Example 52, the subject matter of Example 51 optionally includes, wherein: the notification resource is repeated periodically such that the notification resource occurs in different subframes.

In Example 53, the subject matter of any one or more of Examples 47-52 optionally include, wherein: the discovery message comprises a data channel and an acknowledgment/non-acknowledgment (ACK/NACK), the data channel comprising a plurality of symbols after a first symbol and before a last symbol and comprising at least one of a temporary ID or a MAC ID of the other UE and authentication information, the ACK/NACK disposed in the last symbol of the first subframe, the discover ID based on the one of the MAC ID or the temporary ID of the other UE.

In Example 54, the subject matter of any one or more of Examples 47-53 optionally include, wherein: the predefined DL resource is dependent on at least one of an ID of the other UE or the at least one of the temporary ID or MAC ID of the UE.

In Example 55, the subject matter of any one or more of Examples 47-54 optionally include, wherein: the discovery ID is based on the MAC ID and a previous discovery ID.

In Example 56, the subject matter of any one or more of Examples 47-55 optionally include, wherein: the random access request comprises a bit to indicate whether the random access request is a request for data transmission or a request for random access.

In Example 57, the subject matter of Example 56 optionally includes, further comprising: in response to a failure to receive a response from the other UE in response to the random access request or to reception of a response comprising a bit that indicates that the one of a temporary ID or a MAC ID of the UE is in use, selecting a new ID for transmission in a new random access request.

In Example 58, the subject matter of any one or more of Examples 47-57 optionally include, further comprising: decode a response from the other UE in response to the random access request, the response comprising data transmission information that comprises a modulation and coding scheme and transmit power recommendation, the response scrambled by the one of the temporary ID or the MAC ID of the UE; and encode a data transmission to the other UE based on the data transmission information.

In Example 59, the subject matter of Example 58 optionally includes, wherein: the data transmission comprises one of the MAC ID or the temporary ID of the UE, the processing circuitry is further configured to decode a response to the data transmission, the response comprising one of: an acknowledgement (ACK) scrambled with the temporary ID of the UE to indicate that no contention is present with the temporary ID of the UE, or a non-acknowledgement (NACK) scrambled with the temporary ID of the UE to indicate that contention is present with the temporary ID of the UE.

In Example 60, the subject matter of Example 59 optionally includes, wherein: the data transmission further comprises at least one of a field to indicate a reason for random access or a field that indicates at least one of category or capability of the UE.

In Example 61, the subject matter of any one or more of Examples 59-60 optionally include, further comprising: in response to reception of the NACK, generating a new temporary ID and initiate a random backoff mechanism to transmit a new random access request after a random amount of time, the new random access request comprising the new temporary ID.

In Example 62, the subject matter of Example 61 optionally includes, wherein: the new temporary ID is one of: randomly selected or based on the temporary ID.

Example 63 is an apparatus of a user equipment (UE), the apparatus comprising: means for receiving, at a notification resource scrambled by a discovery identity (ID) of another UE, an indication of transmission in a next downlink (DL) transmission time interval of a discovery message, the discovery ID selected from a pool of discovery IDs; means for receiving the discovery message in a first subframe; means for transmitting, in response to the discovery message, a random access request to the other UE in a second subframe, the random access request comprising discovery content of the UE that comprises a temporary ID of the UE, the discovery content disposed in a plurality of symbols after a first symbol and before a last symbol of the second subframe; means for receiving a response from the other UE in response to the random access request, the response comprising data transmission information and scrambled by the temporary ID of the UE; means for transmitting, based on the data transmission information, a contention resolution packet data unit (PDU) to the other UE; and means for receiving a response to the data transmission, the response comprising one of: an acknowledgement (ACK) scrambled with the temporary ID of the UE to indicate that no contention is present with the temporary ID of the UE, or a non-acknowledgement (NACK) scrambled with the temporary ID of the UE to indicate that contention is present with the temporary ID of the UE.

In Example 64, the subject matter of Example 63 optionally includes, wherein: a first symbol of the second subframe contains an indication of whether the second subframe is an uplink (UL) or DL subframe, the first symbol scrambled by the discovery ID, and the random access request at least one of: is transmitted in a predetermined Physical Resource Allocation (PRA) reserved for random access requests, or comprises a bit to indicate whether the random access request is a request for data transmission or a request for random access.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus of user equipment (UE), the apparatus comprising:
    memory; and
    a processor in communication with the memory and arranged to:
        decode a discovery message from another UE, the discovery message scrambled by a discovery identity (ID) selected from a pool of discovery IDs, the pool of discovery IDs stored in the memory, the discovery message received in a predefined downlink (DL)

resource in a first subframe, wherein the predefined DL resource is dependent on at least one of an ID of the other UE or at least one of a temporary ID or a Media Access Control (MAC) ID of the UE; and encode, for transmission to the other UE, a random access request in a second subframe after receipt of the first subframe, the random access request comprising discovery content comprising one of the temporary ID or the MAC ID of the UE and disposed in a plurality of symbols after a first symbol and before a last symbol of the second subframe, the temporary ID generated based on the MAC ID.

2. The apparatus of claim 1, wherein the processor is further configured to:

determine whether the second subframe is an uplink (UL) or DL subframe dependent on a first symbol of the second subframe, the first symbol scrambled by the discovery ID, wherein the random access request is encoded after a determination that the second subframe is a UL subframe.

3. The apparatus of claim 2, wherein the processor is further configured to:

select among a plurality of physical resource assignments (PRAs) in the second subframe for transmission of the random access request, the selection dependent on the at least one of the temporary ID or MAC ID of the UE.

4. The apparatus of claim 2, wherein the processor is further configured to:

randomly select among a plurality of physical resource assignments (PRAs) in the second subframe for transmission of the random access request.

5. The apparatus of any one or more of claims 1-4, wherein the processor is further configured to:

decode, at a notification resource scrambled by the discovery ID, an indication of transmission in a next DL transmission time interval of one of a discovery message, a paging message or absence of a discovery and paging message, the discovery ID based on one of a MAC ID or a temporary ID of the other UE.

6. The apparatus of claim 5, wherein:

the notification resource is repeated periodically such that the notification resource occurs in different subframes.

7. The apparatus of any one or more of claims 1-4, wherein:

the discovery message comprises a data channel and an acknowledgement/non-acknowledgment (ACK/NACK), the data channel comprising a plurality of symbols after a first symbol and before a last symbol and comprising at least one of a temporary ID or a MAC ID of the other UE and authentication information, the ACK.JN ACK disposed in the last symbol of the first subframe, the discovery ID based on the one of the MAC ID or the temporary ID of the other UE.

8. The apparatus of any one or more of claims 1-4, wherein:

the discovery ID is based on the MAC ID and a previous discovery ID.

9. The apparatus of any one or more of claims 1-4, wherein:

the random access request comprises a bit to indicate whether the random access request is a request for data transmission or a request for random access.

10. The apparatus of claim 9, wherein the processor is further configured to:

in response to a failure to receive a response from the other UE in response to the random access request or to reception of a response comprising a bit that indicates that the one of a temporary ID or a MAC ID of the UE is in use, select a new TD for transmission in a new random access request.

11. The apparatus of any one or more of claims 1-4, wherein the processor is further configured to:

decode a response from the other UE in response to the random access request the response comprising data transmission information that comprises a modulation and coding scheme and transmit power recommendation, the response scrambled by the one of the temporary ID or the MAC ID of the UE; and encode a data transmission to the other UE based on the data transmission information.

12. The apparatus of claim 11, wherein:

the data transmission comprises one of the MAC ID or the temporary ID of the UE, the processing circuitry is further configured to decode a response to the data transmission, the response comprising one of:

an acknowledgement (ACK) scrambled with the temporary ID of the UE to indicate that no contention is present with the temporary ID of the UE, or a non-acknowledgement (NACK) scrambled with the temporary ID of the UE to indicate that contention is present with the temporary ID of the LTE.

13. The apparatus of claim 12, wherein:

the data transmission further comprises at least one of a field to indicate a reason for random access or a field that indicates at least one of category or capability of the UE.

14. The apparatus of claim 12, wherein the processor is further configured to:

in response to reception of the NACK, generate a new temporary ID and initiate a random backoff mechanism to transmit a new random access request after a random amount of time, the new random access request comprising the new temporary ID.

15. The apparatus of claim 14, wherein:

the new temporary ID is one of: randomly selected or based on the temporary ID.

16. The apparatus of any one or more of claims 1-4, wherein:

the processor comprises a baseband processor, and the apparatus further comprises a transceiver configured to communicate with the other UE.

17. An apparatus of user equipment (UE), the apparatus comprising:

memory; and a processor in communication with the memory and arranged to:

encode for transmission on a notification resource, an indication of transmission in a next downlink (DL) transmission time interval of a discovery message, the indication scrambled by a discovery identity (ID) of the UE, the discovery ID selected from a pool of discovery IDs;

encode the discovery message for transmission in a first subframe;

transmit the discovery message in the first subframe using a DL resource, wherein the DL resource is dependent on at least one of the discovery ID or at least one of a temporary ID or a Media Access Control (MAC) ID of another UE; and decode, in response to the discovery message, a random access request from the other UE in a second subframe, the random access request comprising discovery content of the other UE, the discovery content comprising the temporary ID or the MAC ID of the other UE.

18. The apparatus of claim 17, wherein:
a first symbol contains an indication of whether the second subframe is an uplink (UL) or DL subframe, the first symbol scrambled by the discovery ID.

19. The apparatus of claim 17 or 18, wherein:
the discovery message comprises a data channel and an acknowledgment/negative acknowledgement (ACK/NACK), the data channel comprising a plurality of symbols after a first symbol and before a last symbol and comprising a temporary ID of the UE and authentication information, the ACK/NACK disposed in the last symbol of the first subframe.

20. The apparatus of claim 17 or 18, wherein:
the discovery ID is based on a Media Access Control (MAC) ID of the UE and a previous discovery ID.

21. The apparatus of claim 17 or 18, wherein the processor is further configured to:
determine that the random access request is a random access request based on reception of a new ID in the random access request.

22. The apparatus of claim 17 or 18, wherein the processor is further configured to:
determine that the random access request is a random access request based on reception of the random access request in a predetermined Physical Resource Allocation (PRA).

23. The apparatus of claim 17 or 18, wherein:
the random access request comprises a bit to indicate which of a request for data transmission or a request for random access the random access request is.

24. The apparatus of claim 17 or 18, wherein the processor is further configured to:
in response to reception of the random access request, transmit a response containing transmission information for the other UE, the response scrambled by the temporary ID of the other UE and in response to collision between the random access request and a data transmission from a further UE, avoid transmission of the response.

25. The apparatus of claim 17 or 18, wherein the processor is further configured to:
in response to an ID collision in which multiple other UEs use the temporary ID of the other UE, one of:
avoid transmission of a response to the random access request,
transmit a response to the random access request comprising a bit that indicates that the temporary ID is already in use, or
in response to reception of a subsequent contention resolution request from the other UE, encode a negative acknowledgment (NACK) for transmission to the other UE.

26. The apparatus of claim 17 or 18, wherein the processor is further configured to:
in response to reception of the random access request, transmit a response containing transmission information for the other UE, the response scrambled by the temporary ID of the other UE,
decode, after transmission of the response, a contention resolution packet data unit (PDU) from the other UE, the contention resolution PDU comprising a Media Access Control (MAC) ID of the other UE and at least one of a field to indicate a reason for random access or a field that indicates at least one of category or capability of the other UE.

27. The apparatus of claim 26, wherein the processor is further configured to:
encode a response to the contention resolution PDU, the response to the contention resolution PDU comprising one of:
an acknowledgement (ACK) scrambled with the temporary ID of the UE to indicate that no contention is present with the temporary TD of the UE, or
a negative acknowledgement (NACK) scrambled with the temporary ID of the UE to indicate that contention is present with the temporary ID of the UE.

28. A non-transitory, computer-readable storage medium that stores instructions for execution by one or more processors of a user equipment (UE), the one or more processors to:
receive, at a notification resource scrambled by a discovery identity (ID) of another UE, an indication of transmission in a next downlink (DL) transmission time interval of a discovery message, the discovery ID selected from a pool of discovery IDs;
receive the discovery message in a first subframe;
transmit, in response to the discovery message, a random access request to the other UE in a second subframe, the random access request comprising discovery content of the UE that comprises a temporary 1D of the UE, the discovery content disposed in a plurality of symbols after a first symbol and before a last symbol of the second subframe;
receive a response from the other UE in response to the random access request, the response comprising data transmission information and scrambled by the temporary ID of the UE;
transmit, based on the data transmission information, a contention resolution packet data unit (PDU) to the other UE; and
receive a response to the data transmission, the response comprising one of:
an acknowledgement (ACK) scrambled with the temporary ID of the UE to indicate that no contention is present with the temporary ID of the UE, or
a non-acknowledgement (NACK) scrambled with the temporary ID of the UE to indicate that contention is present with the temporary ID of the UE.

29. The non-transitory, computer-readable storage medium of claim 28, wherein:
the instructions further configure the one or more processors to a first symbol of the second subframe contains an indication of whether the second subframe is an uplink (UL) or DL subframe, the first symbol scrambled by the discovery ID, and
the random access request at least one of:
is transmitted in a predetermined Physical Resource Allocation (PRA) reserved for random access requests, or
comprises a bit to indicate whether the random access request is a request for data transmission or a request for random access.

* * * * *